United States Patent
Kobayashi

(10) Patent No.: US 8,780,235 B2
(45) Date of Patent: Jul. 15, 2014

(54) IMAGE PROCESSING METHOD

(75) Inventor: Masahiro Kobayashi, Hyogo (JP)

(73) Assignee: Logic & Systems, Inc., Kobe (JP)

( * ) Notice: Subject to any disclaimer, the term of this patent is extended or adjusted under 35 U.S.C. 154(b) by 3 days.

(21) Appl. No.: 13/517,569

(22) Filed: Jun. 13, 2012

(65) Prior Publication Data
US 2013/0176464 A1    Jul. 11, 2013

(30) Foreign Application Priority Data
Jun. 14, 2011   (JP) ................. 2011-131764

(51) Int. Cl.
*H04N 5/217* (2011.01)
*H04N 9/64* (2006.01)
*H04N 5/76* (2006.01)
*G06K 9/40* (2006.01)

(52) U.S. Cl.
USPC ......... 348/241; 348/243; 348/231.9; 382/254

(58) Field of Classification Search
CPC ..... H04N 5/361; H04N 5/363; H04N 1/2112; G06T 5/002; G06T 5/001; G06T 5/50
USPC .................. 348/241, 243, 220.1, 231.9, 242; 382/254, 274
See application file for complete search history.

(56) References Cited

U.S. PATENT DOCUMENTS

| | | | | |
|---|---|---|---|---|
| 2006/0221253 | A1* | 10/2006 | Kai et al. | 348/701 |
| 2006/0232709 | A1* | 10/2006 | Renner et al. | 348/607 |
| 2008/0111901 | A1* | 5/2008 | Kawashima | 348/241 |
| 2008/0204600 | A1* | 8/2008 | Xu et al. | 348/607 |
| 2010/0220223 | A1* | 9/2010 | Tsuruoka | 348/242 |

FOREIGN PATENT DOCUMENTS

| | | | |
|---|---|---|---|
| JP | 2005-078175 A | 3/2005 | |
| JP | 2005-062993 A | 10/2005 | |

* cited by examiner

*Primary Examiner* — Nhan T Tran
*Assistant Examiner* — Xi Wang
(74) *Attorney, Agent, or Firm* — Lee Fredric Sharra

(57) ABSTRACT

This invention provides an image processing method which for noise reduction and sensitization for an ordinary video camera. The noise reduction processing locates a bright pixel and averages brightness by adding the pixel accumulated by ratio in accordance with the geometric series, and to a dark pixel, carrying out the processing of noise reduction which averages brightness by adding the pixel accumulated by ratio in accordance with the geometric series and the processing of sensitization in the condition that a magnification of intensification is greater than 1, determine that the pixel moves or not, if the pixel is moving, it is used to carry out processing of sensitization only, and if the pixel is still, choose it is used to carry out the processing of sensitization and noise reduction.

1 Claim, 3 Drawing Sheets

IMAGE PROCESSING METHOD

CROSS-REFERENCE TO RELATED APPLICATIONS

This application claims priority to the Japanese Patent Application JP 2011-131764 A filed Jun. 14, 2011.

FIELD OF THE INVENTION

This invention relates to an image processing system to prevent highlight clipping (over exposure) and interference to vision (persistence of vision) during noise reduction and intensifying treatment on an accumulation basis for animation data photographed by video cameras.

BACKGROUND ART

In the digital image processing of animation data photographed by a video camera, noise is also amplified when the brightness is enhanced by gain adjustment to dark data or when the detail of the animation data is highlighted by image processing such as a picture improvement filter. Therefore, some parts cannot be clearly seen due to noise interference even if the brightness is enhanced or detailed data is highlighted.

In general, this noise is random, so the noise can be removed by taking an average over a plurality of animation frames. A commercial video camera comprises a slow shutter mode as well as a gain adjustment for enhancing the brightness of dark data. The camera has problems set out below even if the brightness is enhanced and the noises are muted.

Problem 1

The shutter speed is slow and it cannot secure a reasonable frame rate. For example, the camera cannot clearly capture a moving target with a shutter speed of only 5 shutter closures per second.

Problem 2

The accumulation of a plurality of frames and a prolonged open shutter time causes blurring and a moving target is not recognized.

Problem 3

Under a situation of low/narrow dynamic range with bright conditions (such as fog), the camera cannot be used due to over exposure.

Problem 4

Even in a dark picture, over exposure in a bright part of the picture causes highlight clipping.

Problem 5

Thermal noise (dark noise) is conspicuous, it is amplified by the act of exposing the noise to too much light.

To solve these problems, an image processing system is considered that adds image data to a frame buffer at the same ratio to perform a processing of noise reduction and sensitization (for enhancing the brightness of dark data) simultaneously.

When a dark image is processed by the above methods, one plane of a frame buffer for image accumulation is prepared as an accumulation buffer, ratio R and pixel data of an image frame are multiplied and this multiplied value is added to the accumulation buffer and this process is repeated. In this method, by continuing to add the value of the image data in ratio R to a frame buffer, the brightness of the image becomes the infinite geometric series of ratio R. The sum of infinite geometric series is equal to A/(1−R). Therefore, when N is the objective magnification of brightness, R is equal to (N−1)/N.

(First term is A, A is equal to 1 when N is greater than 1)

If the magnification of the brightness is greater than 1, overflow is caused. Therefore, when it is required to calculate an image of 8 bits for in magnification N, the bit of the accumulation buffer has to be 8+base-2 of logarithm. (8+log 2) As a result of the above, objective brightness can be obtained some frames later after accumulation.

For example, a value of objective magnification of the brightness is 8, R is ⅞. Therefore, the content of the frame buffer is ⅞, and a new frame is added to the frame buffer, and it is stored in the accumulation buffer. For example, after processing 30 frames using the above method, the brightness of the image becomes the value multiplied by 8 in comparison with the original image.

If an object is a bright image, it is set so that the sum of the first term A and the proportional value R become 1 (A+R=1). When R is greater than 0 and less than 1 (0<R<1), the sum converges to 1. This means that the brightness is not changed.

Using the above method, noise can be removed without a change in the brightness since a plurality of the image is accumulated. For example, in the situation with that R is equal to one over four and A(1) is equal to three over four (R=¼, A(1)=¾), frame buffer is set at three over four (¾). Also, a new frame with a size of one over four is added to the frame buffer and it is stored in accumulated frame buffer. Repeating this process makes a transformation of the size of data 25%→18%→14%→10%→8%→6%. Also, each value is added to the frame buffer. Therefore, after having repeated 12 frames, the brightness obtained for the accumulated image is the same as the brightness of the original image.

Applying the above method, removal of noise and sensitization handling of data by the accumulation method can be carried out simultaneously, and problems 1, 3 and 5 can be solved.

Regarding problem 1, since the shutter speed of the frame using the method is the same as the traditional speed and the image update is carried out by each frame unit, the problem regarding the chasing of the moving object is not generated. Also, the ratio of the last frame in the image is the largest, thus the picture can clearly be seen when the plurality of frame buffers are added.

Regarding problem 2, since accumulation is carried out by each frame unit, a blurring is not caused. However, an afterimage exists, and a moving object seems to leave a trail.

Regarding problem 3, because magnification of the brightness can accumulate with 1, no problem occurs with a bright image. Also, it is not necessary to increase or decrease a frame buffer because the stockpile can be adjusted by using a parameter. Regarding problem 4, if magnification of the brightness becomes greater than 1, the problem remains of a white area at the point of overflow by accumulation. Regarding problem 5, because the shutter speed is the same or slower than the traditional speed of frame, the problem of heat noise does not occur.

Therefore, in the method in which one piece of accumulation buffer is repeated so that the same ratio is multiplied to a new frame and added to the accumulation buffer is very effective in noise removal and sensitization. However, there still remain the problems of white clipping when magnification of the brightness is raised and of a moving object having an afterimage.

An image processing device for still images using the following means is disclosed in patent document 1. Means for deciding the quantity of revision; determine the quantity of revision of brightness of the image data and the quantity of contrast revision of the image data by using a brightness reference value and contrast reference value which is the base for adjustment of the brightness of the picture. Means for correcting a quantity of revision of brightness; this means decrease a quantity of brightness amendment as a quantity of an exposure amendment increase. Means for correcting a quantity of contrast amendment; when the exposure amendment quantity is positive amendment, this means reduce the quantity of contrast amendment as the exposure amendment quantity increases. Picture conditioning means; this means adjust the brightness of the image data by applying quantity of revision of the corrected brightness and adjust the contrast of the image data by applying the quantity of revision of the corrected contrast.

Also, a data processor is disclosed in Prior art 2, the data processor processes three-dimensional data by a neural network, the neural network processes the three-dimensional data as quaternion, the data processor processes photography data of night scope 50 including a very small amount of RGB ingredient, and it can obtain a color image equivalent to what was photographed in the daytime

PRIOR ART PATENT DOCUMENTS

[Prior Art 1] Japanese Patent Application Publication Laid-Open No. 2005-062993

[Prior Art 2] Japanese Patent Application Publication Laid-Open No. 2005-078175

Problem Solved by the Invention

In prior art patent document 1, contrast standard deviation is calculated from an acquired brightness histogram, quantity of original contrast revision is calculated from a reference value of contrast standard deviation and the contrast standard deviation. However, the problem of white clipping remains when the magnification of the brightness is emphasized.

Regarding patent document 2, it cannot obtain a color image similar to an image photographed in the daytime without a reference data which was obtained by photographing the same place in the daytime using a normal video camera.

Therefore, the purpose of the present invention is to solve the problem of white clipping which occurs when magnification of the brightness is increased and an afterimage of a moving object remains, even if it is very dominant in the removal of the noise and the sensitization Means for Solving Problem To solve the problem, the image processing method of the present invention carries out a processing of noise reduction/sensitization and a processing of movement detection for every pixel comprising an input image simultaneously. Regarding the pixel which is judged as moving, choose a pixel value without carrying out the processing of noise reduction, regarding the pixel which is judged as not moving, choose a pixel value with carrying out the processing of noise reduction.

Specifically, the processing of noise reduction/sensitization is comprised of two steps of a first and second processing, in the first processing, the processing of sensitization to a bright pixel is not carried out, and the processing of sensitization to a dark pixel is carried out in the condition that a magnification of intensification is greater than 1. In the second processing, the processing of noise reduction is carried out which averages brightness by adding the pixel accumulated by ratio in accordance with the geometric series to a bright pixel, and the processing of noise reduction is carried out which averages brightness by adding the pixel accumulated by ratio in accordance with the geometric series and the processing of sensitization in the condition that a magnification of intensification is greater than 1 to a dark pixel. Regarding to the processing of movement detective, store the brightness of the latest and a past plurality of frames on which the processing of noise reduction are not carried out and the processing of sensitization in the first ring buffer, store a plurality of the total value of the brightness of latest and a past plurality of frames in the second ring buffer, calculates the absolute value of the difference between the total value of the brightness of the previous frames and the total value of the brightness of the latest frames those are memorized in the second ring buffer using the first calculating means, and determine that the pixel moves when the absolute value is larger than a constant value. Regarding the pixel which is judged as moving by the processing of movement detective, choose the pixel value which is obtained by the first processing of the processing of noise reduction/sensitization, and the pixel which is judged as not moving by the processing of movement detective, choose the pixel value which is obtained by the second processing of the processing of noise reduction/sensitization, and these chosen values output as video image.

After the processing of pixels is finished, the image which was processed at a sensitization magnification that was bigger than 1 is output after making tone curve revision.

Effect of the Invention

According to the composition of claim 1, the processing of noise reduction as well as sensitization is carried out with only one frame buffer, and can prevent white clipping (over exposure).

Even more particularly, the following effect can be obtained just by connecting to an existing camera, there is a noise reduction effect, in particular, gain up and random noise caused by the image enhancement processing decrease sharply. Thereby, a processing of sensitization is enabled in real time, the noise of a dark picture is reduced and it becomes bright including color information, frame skipping and blurring such as in the slow shutter mode are eliminated, and the image can be seen clearly and smoothly. Because an improvement of resolution can be expected, in the case of an image without movement, composites effect is obtained by accumulating an animation, a ratio of S/N which is an improvement over a still image can be obtained. A bright real time image can be obtained without the need for an expensive, high sensitivity camera, and focus can be adjusted on even a dark picture. As for the processing, only one or two multiplications and addition and subtraction are required, so it is easy to implement on hardware. Because processing is completed just by scanning a pixel once, high-speed processing is enabled and a full high vision picture can be processed in real time in current FPGA. Even more particularly, in the case of image processing using a commercial PC, as long as the PC's video board has image resolution of VGA or more, processing is possible.

BEST MODE FOR CARRYING OUT THE INVENTION

In the image processing method of the present invention, when an image is input (s1), sensitization magnification "r" and first term ratio "n" are calculated from a whole frame or an average of brightness of pixels in the frame. (S2) Sensitization magnification r is calculated as "r=identification level÷average" so that the average of the brightness becomes the specific value. When "r" is bigger than 1 (r>1), it is determined that the image is too dark and that sensitization is necessary, and n is set to 1. When "r" is 1 or when "r" is smaller than 1(r≤1), it is determined that the image is bright enough, and "r" and "n" are distributed to become "r+n=1" which is conceivable as a noise reduction parameter. As this occurs, "n" is determined depending on a noise reduction level (the level is specified separately), and "r" is determined depending on this.

After this, it shifts to processing every pixel. A processing of noise reduction/sensitization and processing of movement detective is carried out for every pixel in parallel.

In the processing of noise reduction/sensitization, the first processing and the second processing are carried out. In the first processing, accumulation for noise reduction is not performed. To the pixel that magnification r of intensity is bigger than 1, r is multiplied by the value of the pixel. To the pixel which has 1 or less magnification r of intensity, an existing value is adopted (S3).

In the second processing, the ratio of the accumulation (1−1/r) is calculated by magnification "r" of intensity, and, an accumulation level of the latest image is calculated (S4). Next, the value of a new accumulation buffer is calculated by an accumulated value, ratio n of the first term, the value of the accumulation buffer (S5).

Overflow is generated as a matter of course, when prepare one frame of a frame buffer for image accumulations, and repeat a processing that add the captured frames in ratio "r", and set the magnification of the brightness greater than 1.

As measures of the overflow, in the present invention established magnification to light is applied to the dark part, by making small magnification as bright natural sensitization is achieved without overflow using the tone curve of the brightness amendment graph, thus it solves the problem of overexposure (white clipping).

Figure 1:
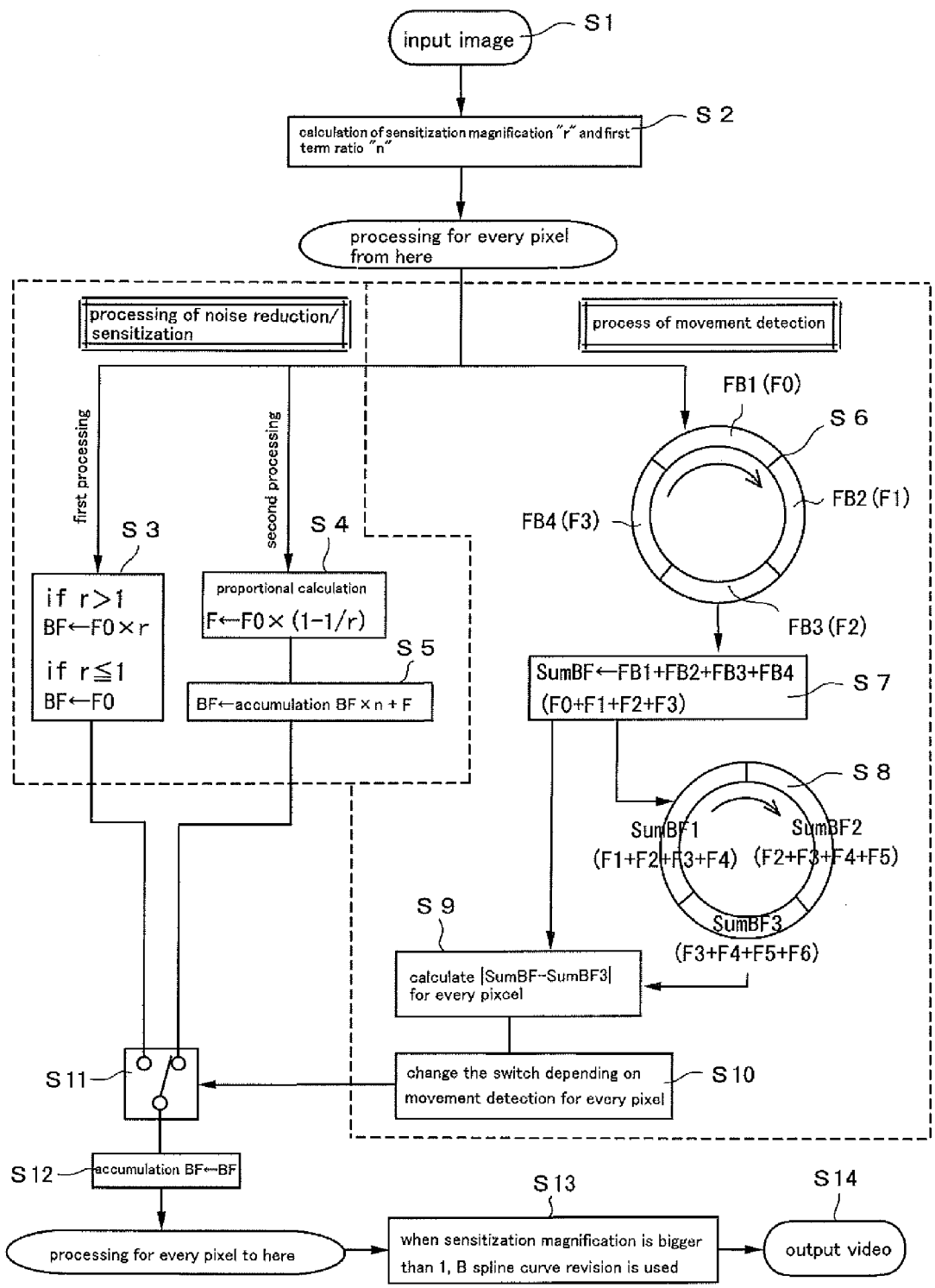
[FIG. 1] The figure which shows the basic function of the image processing device.
Figure 2:
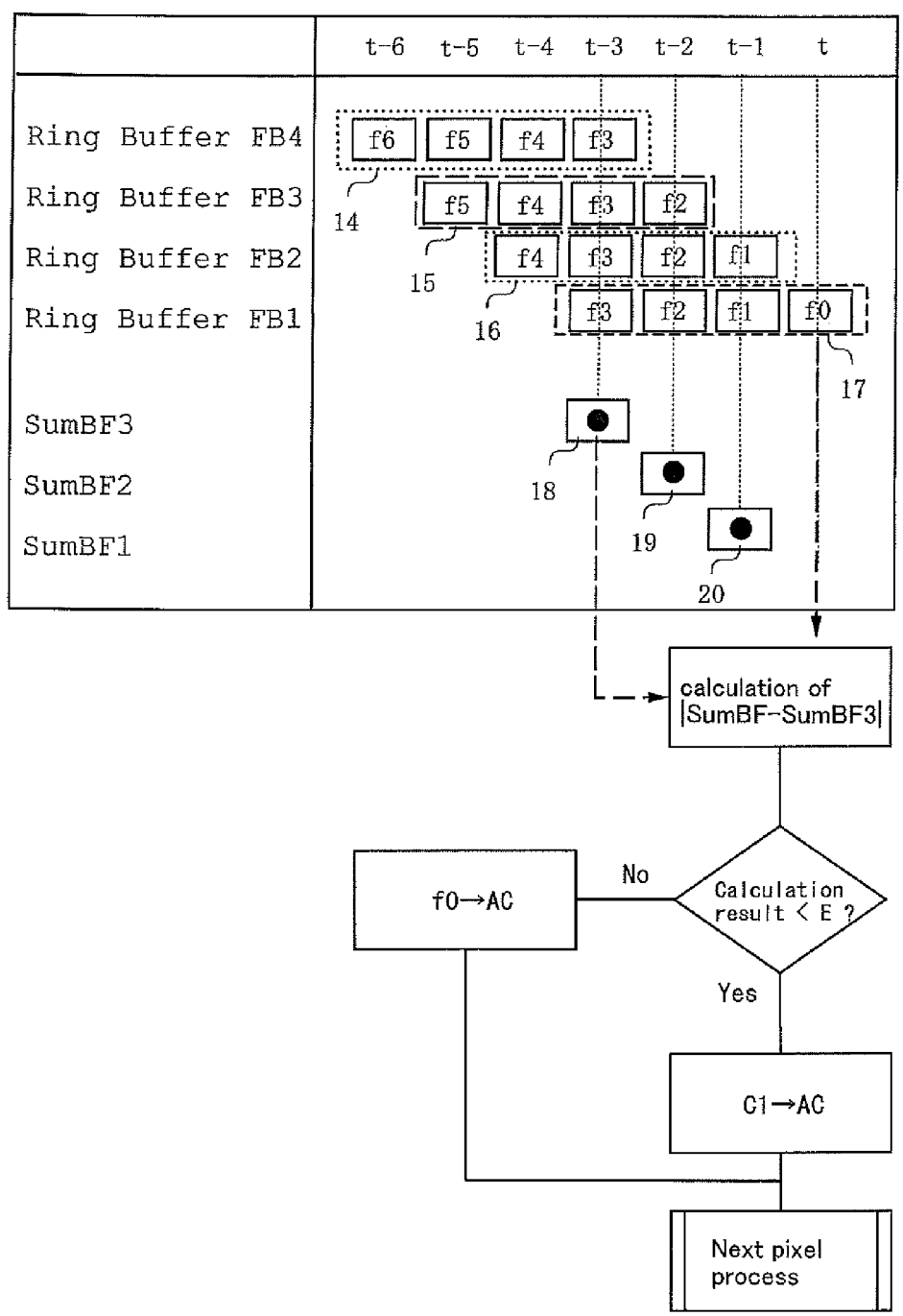
[FIG. 2] The figure which shows the method of the detection of the movement of the pixel.
Figure 3:
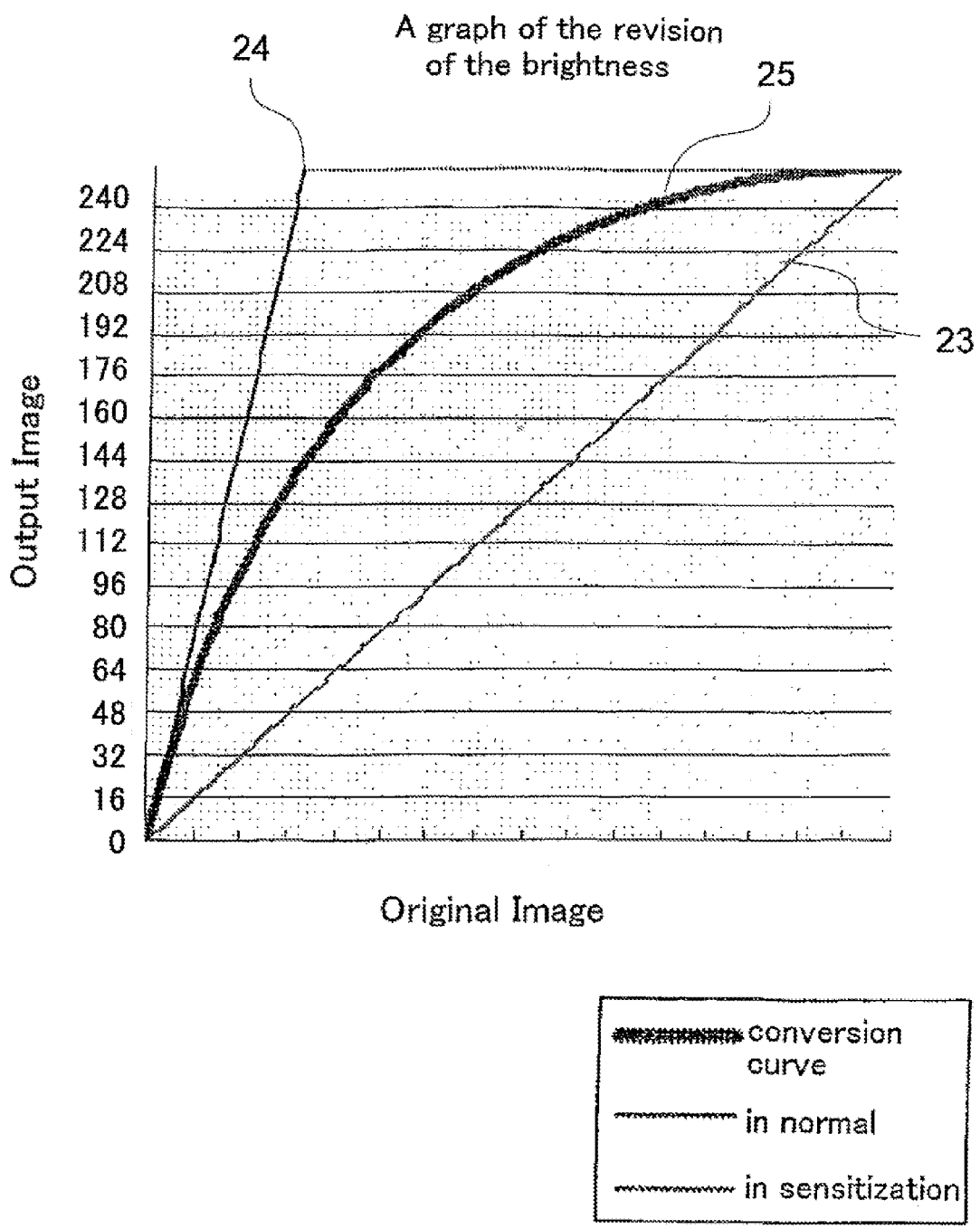
[FIG. 3] A graph of the revision of the brightness with the present invention

FIG. 3 shows the example of the brightness amendment graph in a processing of noise reduction and sensitization. It usually has linear straight line properties 23. When a low part of the brightness is intensified according to normal processing, it shifts or converts to sensitization properties 24. For example, when the value of the magnification is set to 8 with a frame buffer of 8 bits, the accumulated image becomes 256, and all of the pixels having former image value of 16 or more became the overflow The slow shutter mode can be reduced to some extent by gamma revision, however, white clipping also occurs under the situation where there is a light in darkness.

To solve the problem described above, the present invention keeps the degree of angle of the magnification intact to the most dark part, and defines a control point of becoming "0" in a degree of angle of the magnification to the highlight, and smooth conversion curve 25 is provided by performing B spline interpolation.

On the other hand, in the processing of movement detection, the pixel value (brightness) is stored to a frame buffer (ring buffer). In this buffer, when a new pixel value is stored, the oldest pixel value is abandoned. The four latest values are stored in total by a buffer. (S6) For example, when the latest data are supposed to be F0, F0 is stored in FB1, F1 (previous frame) is stored in FB2, F2 (2 frames before) is stored in FB3, F3 (3 frames before) is stored in FB4.

Then, in a multiplication operational circuit, the value of each pixels from F0 to F3 of the frame buffer is processed in total, (The total of FB1-FB4 is calculated) and the result is stored in frame buffer SumBF. (S7)

On the other hand, the data of past total value SumBF are saved to the past frame buffer as SumBF1, SumBF2, and SumBF3. (S8)

In the past data SumBF1 of one frame before, the total processed result of the accumulation of the sum of the pixel data of F1, F2, F3 and F4 is stored (i.e. F1 is one frame before, F2 is two frames before, F3 is three frames before, F4 is four frames before).

In the past data SumBF2 of two frames before, the total processed result of the accumulation of the sum of the pixel data of F2, F3, F4 and F5 is stored (i.e. F2 is two frames before, F3 is three frames before, F4 is four frames before, F5 is five frames before).

In the past data SumBF3 of three frames before, the total processed result of the accumulation of the sum of the pixel data of F3, F4, F5 and F6 is stored (i.e. F3 is three frames before, F4 is four frames before, F5 is five frames before, F6 is six frames before).

And in the processing of movement detection, calculate the difference of the latest SumBF and SumBF3 which is 3 frames before from the latest frame for each pixel, and the absolute difference of SumBF−SumBF3 is calculated.

When the absolute value of the difference of two values by the above is greater than the predetermined reference value, it is determined that the pixel is moving or determined that the movement of the pixel is large, and when the absolute value is smaller than the reference value it is determined that the pixel is static or determined that movement of the pixel is small. (S10)

A switch is changed depending on the result of the judgment. (S11) That is, when determined that the image is moving, the value of the pixel which was obtained in the first processing of the noise reduction/sensitization process is adopted. In other words, a switch is changed to the direction adopting the value of the pixel for which accumulation for noise reduction was not processed. And when determined that the image is not moving, the value of the pixel which was obtained in the second processing of the noise reduction/sensitization is process is adopted. In other words a switch is changed to the direction adopting the value of the pixel for which accumulation for noise reduction was processed.

The value of the calculation result of the switch is updated in the accumulation buffer. (S12) The accumulation buffer requires bit depth depending on magnification "r" of intensifying. (when r>1, bit depth+log 2(r) bit)

The above description is processing to perform to each pixel. After this processing was carried out, when sensitization magnification is bigger than 1, tone curve revision is made by a tone curve revision circuit. (S13) In a tone curve revision circuit, the tone curve revision parameter prescribed by data of the whole frame provided in another processing is applied to the pixel. For tone curve revision, for example, B spline curve revision is considered.

Then, the normalized picture data by a tone curve revision circuit are output from a video output circuit. (S14)

Industrial Applicability

By using the technique of the present invention, a bright real time picture can be obtained even if an expensive high sensitivity camera is not used. Even if it is only connected to a normal camera, focus adjustment is possible to a dark picture. For example, for an ancient fresco, which it is believed might be damaged if exposed to strong light, a color picture can be photographed in low level light. Even more particularly, in the depths of the sea, where a cable broadcasting camera utilizing an infrared function is normally required, photographs can be taken with a cheap unmanned camera. Therefore this invention will be very useful in marine resource development.

Explanations of the Letters and Numerals

S1—Image inputting

S2—A calculation of first term ratio N and magnification R of intensification

S3—The first processing

S4 and S5—The second processing

S6—A ring buffer storing the brightness of latest frame and the three previous frames S7—The handling of total of the frame buffer, S8—A buffer storing the result of the total of three previous frames, S9—Modulus calculation, S10—A detection of the movement, S11—A switch, S12—The accumulation buffer, S13—Tone curve revision, S14—A video output

What is claimed is:

1. An image processing method to process animation data photographed with video cameras, this image processing method can carry out processing of noise reduction/sensitization and processing of movement detection for every pixel in parallel;

the processing of noise reduction/sensitization is comprised of two steps of a first and second processing, in the first processing, it does not carry out the processing of sensitization to a bright pixel, and carries out the processing of sensitization to a dark pixel in the condition that a magnification of intensification is greater than 1, in the second processing, it carries out the processing of noise reduction which averages brightness by adding the pixel accumulated by ratio in accordance with the geometric series to a bright pixel, and carries out the processing of noise reduction which averages brightness by adding the pixel accumulated by ratio in accordance with the geometric series and the processing of sensitization in the condition that a magnification of intensification is greater than 1 to a dark pixel, regarding to the processing of movement detection, store the brightness of the latest and a past plurality of frames on which the processing of noise reduction and the processing of sensitization are not carried out in the first ring buffer, store a plurality of the total value of the brightness of the latest and a past plurality of frames in the second ring buffer, calculates the absolute value of the difference between the total value of the brightness of the old frames and the total value of the brightness of the latest frames, those are memorized in the second ring buffer using the first calculating means, and determine that the pixel moves when the absolute value is larger than a constant value, regarding the pixel which is judged as moving by the processing of movement detection, choose the pixel value which was obtained by the first processing of the processing of noise reduction/sensitization, and for the pixel which is judged as not moving by the processing of movement detection, choose the pixel value which is obtained by the second processing of the processing of noise reduction/sensitization, and these chosen values output as a video image.

* * * * *